United States Patent [19]
Toyoda

[11] 3,975,747
[45] Aug. 17, 1976

[54] OFF-PHOTOMETRIC-RANGE INDICATOR FOR EXPOSURE METER

[75] Inventor: Kenji Toyoda, Kawasaki, Japan

[73] Assignee: Nippon Kogaku K.K., Tokyo, Japan

[22] Filed: May 1, 1975

[21] Appl. No.: 573,396

[30] Foreign Application Priority Data
May 9, 1974    Japan.............. 49-51645[U]

[52] U.S. Cl.................. 354/60 E; 250/214 P; 356/226
[51] Int. Cl.².................. G03B 7/00; G01J 1/44
[58] Field of Search............ 354/60 R, 60 E, 60 L; 356/224, 226; 250/214 P

[56] References Cited
UNITED STATES PATENTS

| | | | |
|---|---|---|---|
| 3,620,142 | 11/1971 | Engelsmann et al. | 354/60 L |
| 3,712,192 | 1/1973 | Ono et al. | 354/60 E |
| 3,818,495 | 6/1974 | Sagara et al. | 354/60 L |

Primary Examiner—L. T. Hix
Assistant Examiner—James LaBarre
Attorney, Agent, or Firm—Fitzpatrick, Cella, Harper & Scinto

[57] ABSTRACT

An off-photometric-range indicating device for photometric circuits for cameras visually indicates to a photographer when the brightness of an object to be photographed is off the set photometric range of the photometric circuit. The indicating device includes a detection circuit to detect the brightness of the object and to produce an output signal when the detected value of the brightness is out of the photometric range of the photometric circuit, a switching circuit connected to the detection circuit and operated by said output signal, and a circuit connected to the switching circuit and actuated by the operation of the switching circuit to scale out the indicator, which may be visually observed by the photographer.

7 Claims, 4 Drawing Figures

(a)

(b)

3,975,747

OFF-PHOTOMETRIC-RANGE INDICATOR FOR EXPOSURE METER

BACKGROUND OF THE INVENTION

1. Field of the Invention

This invention relates to an off-photometric-range indicator in exposure meters for cameras whereby when the brightness of the object to be photographed is not consistent with the set photometric range of the photometric circuit such condition is visually indicated to the photographer.

2. Description of the Prior Art

Among the known techniques relating to such indicating devices is a method according to which when the luminous intensity on the light receiving surface of a receptor element becomes higher or lower than a certain preset absolute value, such occurrence is indicated by operation of a luminous element such as luminous diode, as for instance proposed in U.S. Pat. No. 3,810,208. This method, as disclosed in said patent, has the advantage that the structure of the device is simplified as no complicated mechanical arrangement is needed; but, on the other hand, it has a drawback in that extra space is required in which to incorporate a luminous element such as luminous diode which is indispensable in this method, and in some cases, there is further necessitated an extra optical system for guiding the light beams from the luminous element into the view finder. Also, as the luminous element, such as luminous diode, consumes relatively high quantities of power as compared with other circuit parts, the battery is quickly exhausted. This becomes a serious problem, particularly when the camera is kept in storage for a long time. Usually, when a camera is not used, it is placed in a dark place where the ambient light intensity is outside the photometric range of the photometric circuit, so that if the power switch of the warning device is kept on, the luminous element in the warning device remains lighted to consume power wastefully, and this could result in exhaustion of the battery during storage of the camera. In the case of a TTL (through-the-lens) photometric camera, the aforementioned difficulty could occur even if the camera is not placed in a dark place, because the light to the receptor element is shut off if the lens cap is left mounted.

Further, conventional exposure indicators often give false indications to misguide the photographer when the light intensity of the object is outside the set photometric range.

SUMMARY OF THE INVENTION

I have conceived an improved off-photometric-range indicator device by which I am able to provide a photometric range indication by using the exposure indicator as the off-photometric-range indicating element so as to give off-range indications with the scaleout of the indicator.

According to this invention, the off-photometric-range indicating device includes a detection circuit connected to a photometric circuit, a switching circuit connected to the detection circuit and a further circuit connected to the switching circuit to scale out the indicator. The detection circuit detects the brightness of the object and produces an output signal when the detected value of the brightness is outside the photometric range, the switching circuit operates when receiving said output signal and the other circuit actuates by the operation of the switching circuit to scale out the indicator.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

The present invention will now be described in detail with reference to the preferred embodiments thereof.

Figure 1:
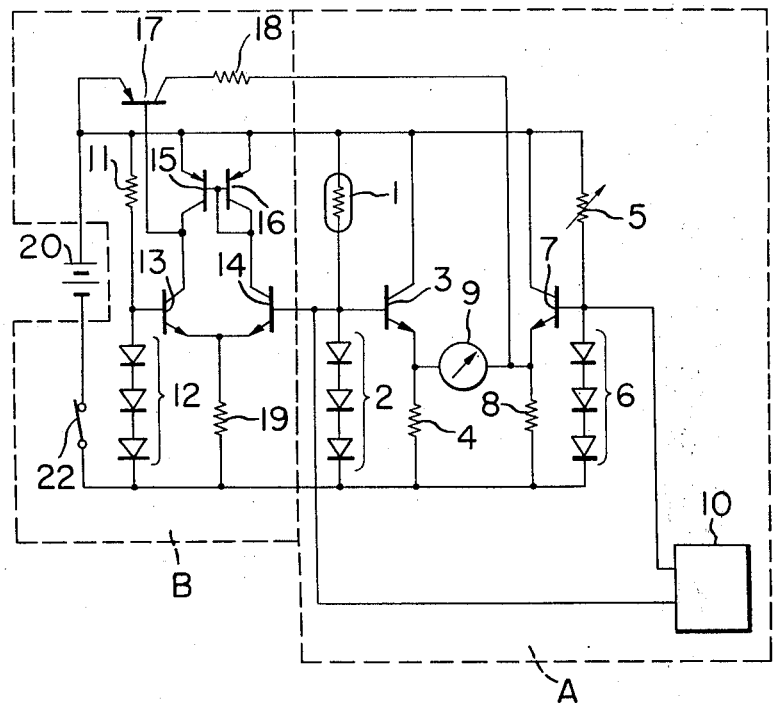
FIG. 1 is a circuit diagram showing a first embodiment of the present invention.

Referring to FIG. 1, there is shown a first embodiment of the present device as it was adapted in an exposure indicating circuit for an electric shutter. According to this embodiment, the portion A is a known exposure indication circuit for an electric shutter, and the portion B illustrates the novel circuitry according to the present invention.

I will first describe the circuit arrangement shown in the portion A wherein a photometric circuit is constituted by a photoconductive element 1 such as Cds cell and a diode 2 which are connected in series to each other so that an output voltage proportional to the logarithm of the brightness of the object to be photographed is produced at the junction therebetween. Also, an exposure factor introduction circuit is constituted by a variable resistance 5 with its resistivity changing corresponding to the setting values of aperture and film sensitivity (when such aperture and film sensitivity are considered as exposure factors) and a diode 6 connected in series to the variable resistance so that an output voltage related to the aperture and film sensitivity is produced at the junction therebetween.

The output of the photometric circuit 1, 2 is applied to one terminal of a voltmeter 9, which serves as an exposure indicator, through an emitter-follower circuit formed by a transistor 3 and a resistance 4, while the output of the exposure factor introduction circuit 5, 6 is fed to the other terminal of the voltmeter 9 through an emitter-follower circuit formed by a transistor 7 and a resistance 8. The voltmeter is designed to give a proper exposure indication according to the difference between both outputs.

The shutter control circuit 10 is adapted to receive both the output of said photometric circuit 1, 2 and the output of the exposure factor introduction circuit 5, 6 so as to control the shutter speed corresponding to the difference between both outputs.

Referring now to the portion B of FIG. 1, a reference voltage generating circuit is constituted by a resistance 11 and a diode 12 connected in series so that there is produced at the junction thereof an output voltage which is a divided part of the voltage of the power source 20, and which is equal to the output voltage of the photometric circuit 1, 2 when the object brightness is at the lower limit of the photometric range of the exposure indicator.

The transistors 13, 14, 15 and 16 and a resistance 19 constitute a differential amplifier to which the output of the photometric circuit 1, 2 and the output of the reference voltage generating circuit 11, 12 constitutes an input. A detection circuit is also constituted by the reference voltage generating circuit and the differential amplifier. A resistance 18 is connected between the power source 20 and the other terminal of the voltmeter 9 through a switching transistor 17 which is operated by the output of the differential amplifier 13, 14, 15, 16, 19. Resistivity of this resistance 18 is so set that when the switching transistor 17 becomes conductive to connect the resistances 18 and 8 to the power source 20, a voltage acting to scale over the pointer of the voltmeter will be produced at the junction of both resistances; that is to say, at the other terminal of the voltmeter 9. Thus, resistance 18 constitutes a circuit for scaling out the voltmeter 9.

Being constructed as substantially described above, the present device operates as follows.

Figure 2:
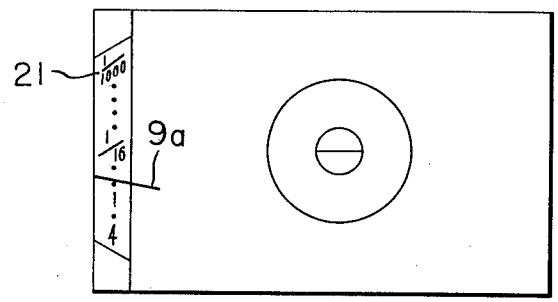
FIG. 2(a) illustrates the exposure scale in the visual field of the viewfinder with a pointer as positioned when the object brightness is within the photometric range.
FIG. 2(b) is similar to FIG. 2(a) but shows the pointer positioned to indicate that the object brightness is outside the photometric range.
Figure 2:
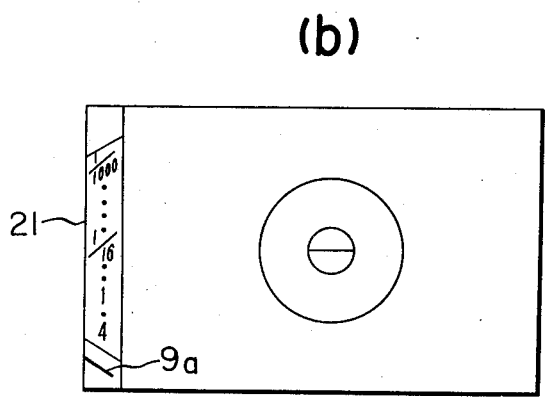

When the object brightness is sufficiently high and stays within the set photometric range, the output voltage of the photometric circuit 1, 2 is higher than the output voltage of the reference voltage generating circuit 11, 12, and hence the collector current of the transistor 14 is greater than that of the transistor 13, so that the transistor 15 is saturated to make the transistor 17 non-conductive. Therefore, the operation of the voltmeter 9 is not affected by the resistance 18 and proper shutter speed is indicated by the pointer 9a of the voltmeter 9 on the shutter scale 21 in the viewfinder of the camera, as shown in FIG. 2(a).

When the object brightness is lower than the lower limit of the photometric range, the output voltage of the photometric circuit 1, 2 becomes lower than the output voltage of the reference voltage generating circuit 11, 12, and hence the collector current of the transistor 13 becomes greater than that of the transistor 14, so that the transistor 15 becomes active or non-conductive while making the transistor 17 conductive. As a result of conduction of this switching transistor 17, a divided portion of the power source voltage is applied to the other end of the voltmeter 9 through the resistances 8 and 18, so that the pointer 9a of the voltmeter 9 scales out without giving any false indication, and is positioned outside the shutter speed scale 21, as shown in FIG. 2(b). The voltmeter 9 in this embodiment is so arranged that when the power switch 22 in FIG. 1 is opened to cut off current supply to the circuit, the pointer 9a points "1/15" inch at the middle of the scale, so that when the object brightness is outside the photometric range, such can be indicated by scale-out of said pointer 9a.

To cite an actual instance, in case the photometric range is above EV 1 when using an ASA-100 film, if ASA-100 exposure and F 1.4 setting is made on the camera, the optimum shutter speed under the brightness of EV 1 (which is at the lower threshold value of the photometric range) is one second. Therefore, if the object brightness is gradually reduced from a value above EV 1 under this condition, the pointer moves slowly downwards while indicating the proper shutter speed for each brightness until it points to 1 second in FIG. 2(a), and at the moment when the object brightness becomes lower than EV 1, the pointer scales over rapidly to take the position shown in FIG. 2(b). From this, the photographer can learn that the object brightness has passed out of the photometric range.

Figure 3:
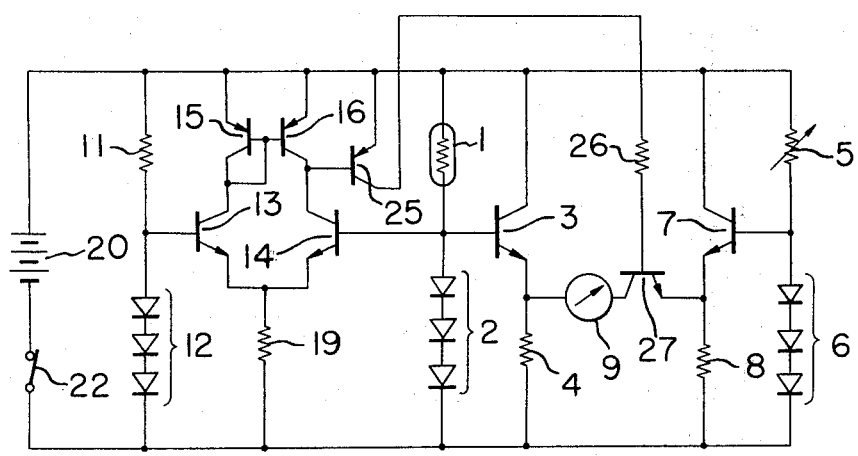
FIG. 3 is a circuit diagram showing a second embodiment of the present invention.

Referring now to FIG. 3, there is shown a second embodiment of the present invention wherein the circuit elements bearing the numerals corresponding to those in FIG. 1, operate in the same manner as in the first embodiment, wherefore only those parts different from those of the first embodiment will be explained in the following description.

I provide a switching transistor 25 operated by a differential amplifier (constituted by the elements 13, 14, 15, 16 and 19), with the base of the switching transistor connected to the collector of the transistor 14 at the output of the differential amplifier, while the emitter of the switching transistor 25 is connected to the positive pole of the power source 20 and the collector to the base of a transistor 27 through a resistance 26. The resistance 26 and the transistor 27 constitute a circuit for effecting scaleover of the pointer of the voltmeter 9. The emitter and collector of the transistor 27 are connected between the voltmeter 9 and the junction of the emitter of the transistor 7 and the resistance 8. The voltmeter 9 is so constructed that its pointer will scale over when the current supply is cut off. Thus arranged, the device operates as follows.

When the object brightness is within the photometric range, the switching transistor 25 stays conductive and hence the transistor 27 is also conductive, while the voltmeter 9 is connected to the emitter-follower circuit 7, 8 by means of transistor 27, so that the voltmeter indicates the proper shutter speed as shown in FIG. 2(a).

On the other hand, if the object brightness is lower than the lower threshold value of the photometric range, the switching transistor 25 becomes non-conductive and hence the transistor 27 is also nonconductive, while the voltmeter 9 is disconnected from the emitter-follower circuit 7, 8 by the transistor 27, so that the pointer 9a of the voltmeter 9 scale over as shown in FIG. 2(b), thus indicating that the object brightness is outside the photometric range.

The object of the present invention can be also attained by using an exposure indicator 9 of a fixed type unlike that in the described embodiments. Also, although the present device has been described as adapted to a photometer in an electric shutter circuit, it can of course be applied to a photometer circuit for an automatic aperture controlled camera. In the latter case, film sensitivity and shutter speed, as exposure factors, are conducted into the variable resistance 5 and the control circuit 10 is arranged to control the objective lens opening, while giving aperture graduations of the scales of FIGS. 2(a) and 2(b).

In the foregoing description of the present invention, I discussed cases wherein the object brightness was below the lower limit of the photometric range, but the same off-photometric-range indication can be made similarly when the object brightness is over the upper limit of the photometric range. Also, in the above-described first and second embodiments of the present invention, there was used a differential amplifier as a component part, but such differential amplifier is not an indispensable part but may be substituted by other suitable means. The present invention is also not restricted to the arrangement in which the switching circuit is energized when the output from the photometric circuit becomes lower than the output from the reference voltage generating circuit; it is possible to use any comparison circuit in which the outputs from the photometric circuit and from the reference voltage generating circuit are received as inputs and the switching circuit is energized when the brightness of the object to be photographed has run off the photometric range.

As apparent from the foregoing description, the off-photometric-range indication is effected in the present invention by using the indicator of the photometer, so that there is required no specific means for making such indication and hence no extra space therefore is needed. Further, since the indicator scales out when the object brightness is off the photometric range, there is no possibility that the indicator will give any false indication for exposure. Battery exhaustion is also minimized as the current consumption is small when the indicator remains at its scaled-out position.

I believe that the construction and operation of my novel off-photometric-range indicating device will now be understood and that the several advantages thereof will be fully appreciated by those persons skilled in the art.

I claim:
1. In a device for indicating off-photometric-range of a photometric circuit in an exposure indicator, the indicating device including:
   a photometric circuit (1, 2) adapted to generate a first voltage in correspondence to the object brightness of an object to be photographed;
   an exposure factor introduction circuit (5, 6) adapted to generate a second voltage which varies according to exposure factors; and
   an indicator (9) connected at one input terminal to said photometric circuit and at its other input terminal to said exposure factor introduction circuit and adapted to indicate a proper value of exposure corresponding to the difference between said first and second voltages,
   the improvements comprising:
   a. a detection circuit (11, 12, 13, 13, 15, 16, 19) connected to said photometric circuit and adapted to detect the object brightness and issue an output signal when the detected value of the object brightness is off the photometric range of said indicator;
   b. a switching circuit (17, 25) connected to said detection circuit and arranged to operate when receiving said output signal; and
   c. a circuit (18, 26, 27) connected between said switching circuit and said indicator and actuated by operation of said switching circuit to scale out said indicator thereby to give the off-photometric-range indication.

2. The device set forth in claim 1, wherein said detection circuit comprises:
   a. a reference voltage generating circuit (11, 12) which generates a fixed voltage equal to the output voltage produced by the photometric circuit when the object brightness is at the limit of the photometric range; and
   b. a comparison circuit (13, 14, 15, 16, 19) which receives the outputs from said reference voltage generating circuit and from said photometric circuit as inputs and compares said inputs and issues a signal to actuate said switching circuit when the object brightness is detected to be off the photometric range.

3. The device set forth in claim 2, wherein said comparison circuit is a differential amplifier.

4. The device set forth in claim 2, wherein said switching circuit, when made conductive, operates said scaling-out circuit.

5. The device set forth in claim 2, wherein said switching circuit, when made non-conductive, operates said scaling-out circuit.

6. The device set forth in claim 4, wherein said scaling-out circuit, when energized, generates a predetermined output voltage at one of the input terminals of said indicator to scale-out said indicator.

7. The device set forth in claim 5, wherein said scaling-out circuit, when energized, shuts off the output at one of the input terminals of said indicator to cut off electric current flowing to said indicator thereby to scale-out said indicator.

* * * * *

UNITED STATES PATENT AND TRADEMARK OFFICE
CERTIFICATE OF CORRECTION

PATENT NO. : 3,975,747
DATED : August 17, 1976
INVENTOR(S) : KENJI TOYODA

It is certified that error appears in the above–identified patent and that said Letters Patent are hereby corrected as shown below:

Column 3, line 21, change "constitutes" to -- constitute --
line 67, delete "inch".
Column 4, line 68, change "of the scales" to -- on the scales --.

Signed and Sealed this

Fifteenth Day of February 1977

[SEAL]

Attest:

RUTH C. MASON
*Attesting Officer*

C. MARSHALL DANN
*Commissioner of Patents and Trademarks*